United States Patent
Silva et al.

(10) Patent No.: US 7,809,472 B1
(45) Date of Patent: Oct. 5, 2010

(54) CONTROL SYSTEM FOR MULTIPLE HEATING, VENTILATION AND AIR CONDITIONING UNITS

(75) Inventors: Richard M. Silva, St. Petersburg, FL (US); Michael E. Nester, Federal Way, WA (US)

(73) Assignee: Custom Manufacturing & Engineering, Inc., Clearwater, FL (US)

( * ) Notice: Subject to any disclaimer, the term of this patent is extended or adjusted under 35 U.S.C. 154(b) by 912 days.

(21) Appl. No.: 11/174,907

(22) Filed: Jul. 5, 2005

Related U.S. Application Data

(60) Provisional application No. 60/585,693, filed on Jul. 6, 2004.

(51) Int. Cl.
  *G05B 15/00* (2006.01)
  *G05D 23/00* (2006.01)
  *F24F 11/00* (2006.01)
  *F24F 11/053* (2006.01)

(52) U.S. Cl. .............. 700/277; 700/210; 700/300; 165/200; 236/1 B; 236/1 C

(58) Field of Classification Search ........... 700/22, 700/79, 210, 276, 277, 286, 291, 293, 295, 700/300; 702/62; 236/1; 165/200
See application file for complete search history.

(56) References Cited

U.S. PATENT DOCUMENTS

| | | | |
|---|---|---|---|
| 4,215,408 A * | 7/1980 | Games et al. | 700/278 |
| 4,335,320 A * | 6/1982 | Garver | 307/39 |
| 4,510,398 A | 4/1985 | Culp et al. | |
| 4,549,274 A | 10/1985 | Lerner et al. | |
| 4,686,630 A | 8/1987 | Marsland et al. | |
| 4,694,192 A | 9/1987 | Payne et al. | |
| 4,711,394 A * | 12/1987 | Samuel | 236/49.3 |
| 4,916,328 A | 4/1990 | Culp, III | |
| 4,931,948 A * | 6/1990 | Parker et al. | 700/277 |
| 5,103,391 A | 4/1992 | Barrett | |
| 5,436,510 A | 7/1995 | Gilbert | |
| 6,115,713 A | 9/2000 | Pascucci et al. | |
| 7,130,719 B2 * | 10/2006 | Ehlers et al. | 700/276 |

* cited by examiner

*Primary Examiner*—Paul L Rodriguez
*Assistant Examiner*—Sheela Rao
(74) *Attorney, Agent, or Firm*—Frijouf, Rust & Pyle, P.A.

(57) ABSTRACT

An environmental control system is disclosed for controlling the environment within a plurality of zones within a building with a plurality of heating, ventilating and air conditioning units. The environmental control system comprises a plurality of controllers for controlling the plurality of heating, ventilating and air conditioning units, respectively. Each of the plurality of controllers includes a temperature sensor connected to a thermostat control for controlling a heating, ventilating and air conditioning unit in accordance with an output from the temperature sensor. A link interconnects the plurality of controllers into a network. Each of the plurality of controllers may alter the operation of the thermostat control in accordance with the operation of the remaining plurality of controllers interconnected into the network. The environmental control system provides multiple modes of operation including a preferred first non-overlap mode for preventing the simultaneous actuation of multiple heating, ventilating and air conditioning units. A less preferred second overlap mode permits simultaneous actuation of multiple heating, ventilating and air conditioning units for only a limited time period and a least preferred third demand saver setback mode lessening the environment requirements to reduce the need to simultaneously actuate multiple heating, ventilating and air conditioning units.

9 Claims, 9 Drawing Sheets

CONTROL SYSTEM FOR MULTIPLE HEATING, VENTILATION AND AIR CONDITIONING UNITS

CROSS-REFERENCE TO RELATED APPLICATIONS

This application claims benefit of U.S. Patent Provisional application Ser. No. 60/585,693 filed Jul. 6, 2004. All subject matter set forth in provisional application Ser. No. 60/585,693 filed Jul. 6, 2004 is hereby incorporated by reference into the present application as if fully set forth herein.

BACKGROUND OF THE INVENTION

1. Field of the Invention

This invention relates to environmental control systems and more particularly to an environmental control system controlling for an environment having a plurality of zones with a plurality of heating, ventilating and air conditioning units

2. Description of the Related Art

Various types of controllers and control systems have been known to the prior art for controlling an air processing units such as an air conditioning and/or heating unit. The most simple of these units comprise a single thermostat control couple to a single air conditioning and/or heating unit. Many complicated units comprise a computer having a plurality of thermostat sensors for controlling temperatures within a plurality of zones with a plurality of heating, ventilating and air conditioning units. Typically, a master control receives information from the plurality of thermostat sensors for controlling the plurality of heating, ventilating and air conditioning units. In some instances, the master control was provided with a program for reducing the peak demand of electrical power required by the plurality of heating, ventilating and air conditioning units.

In many regions of the country, providers of electrical service calculate the cost of electrical service based in part on the peak amount of electric power used by a customer on a given day. The peak amount of electricity used by a customer on a given day is commonly referred to as peak demand. By reducing the peak demand, the electrical customer substantially reduces the overall cost of electrical service.

Many in the prior art have incorporated a system for reducing the peak demand for an air conditioning and/or heating system in order to reduce the overall cost of operation. The following United States patents represents some of the efforts of the prior art for reducing the peak demand in an air conditioning and/or heating system.

U.S. Pat. No. 4,549,274 to Lerner et al discloses a distributed load processing system for shedding and/or adding loads controlled by a plurality of processors for maintaining power demand by the loads below a predetermined amount. The distributed load processing system includes a common communication channel and a plurality of processors connected to the common communication channel, a demand meter for sensing the power consumption per sample period so that the power consumption per sample period can be transmitted to all of the processors. Each processor compares the demand limit established for the system to the projected power per interval being consumed and for shedding and/or adding its associated loads based upon this comparison to maintain power consumption per interval below the demand limit.

U.S. Pat. No. 4,686,630 to Marsland et al discloses a load management control system and method which communicates load shedding information from a central station controller via existing telephone lines to a substation controller. The substation controller in turn controls the tap position selection of a load tap changing transformer to send encoded step voltage signals down a power distribution line to a load control receiver. The load control receiver decodes the encoded signal message and appropriately controls uniquely associated loads. The substation controller interrupts automatic operation of the voltage maintenance circuitry of the load tap changing transformer during transmission of a message. Control is returned to the automatic circuitry of the load tap changing transformer after the message is completed so as to make existence of the load management control system of the present invention transparent to existing equipment in the field. The method of the present invention maximizes utilization of existing lines of communication and existing power distribution field equipment while minimizing the effect on that same equipment.

U.S. Pat. No. 4,694,192 to Payne et al discloses a demand limit control system for maintaining power consumption of loads within a building below an upper demand limit. The upper demand limit is separated from a lower demand limit by a deadband. The system has a power demand controller responsive to power consumption for providing a controller output signal ramping up when the power consumption is above the upper demand limit. The controller output signal remains substantially constant when power consumption is between the upper and lower demand limits. The controller output signal ramps down when the power consumption is below the lower demand limit. A plurality of demand controlled loads are connected to the power demand controller and respond to a different threshold value of the controller output signal such that each load is conditioned to turn off when the controller output signal is above the threshold and is conditioned to turn on when the controller output signal is below the threshold.

U.S. Pat. No. 4,916,328 to Culp discloses an add/shed system and method for adding and shedding loads to maintain the power consumption of a building below the predetermined level. The system includes a plurality of loads and measures the present total power consumption of the building. Selected ones of the loads are reactively shed in response to the measured total power consumption of the building to maintain the present power consumption of the building below the predetermined level. The anticipated future increase or decrease in power consumption of the building is determined and selected ones of the loads are added or shed in response to the measured total power consumption of the building and the anticipated future increase or decrease in power consumption of the building for continuously maintaining the power consumption of the building below the predetermined level.

U.S. Pat. No. 5,103,391 to Barrett discloses a highly distributed direct digital process control system for use in controlling a fully distributed process including at least one device controller independently monitoring and controlling a plurality of external devices for performing a complete process. One or more data concentrator units are connected to the controllers for collecting information from each controller as well as directing updated control information to specific controllers. A central information processing means is connected to the data concentrator for displaying information received from the data concentrator. The central information processing means is capable of updating control information used by specific controllers.

U.S. Pat. No. 5,436,510 to Gilbert discloses a method for managing electric power in a network to which are connected, on the one hand, appliances capable of 2-way communication with each other, each appliance consisting of a power subassembly and a control subassembly and, on the other hand, a so-called power manager unit designed to manage load shedding and re connection functions exclusively affecting the said power subassemblies of each appliance with each disconnectable appliance being disconnected a priori. Any request for significant electric power made by a disconnected appliance results in a transaction between the said appliance and the power manager during which the said requesting disconnected appliances supplies the said power manager with information of a quantitative and qualitative nature concerning the power requested and on completion of which the said power manager authorizes or does not authorize re connection of the power subassembly of the said requesting appliance. The system is used for the implementation of home networks equipped with dynamic management of electric power.

U.S. Pat. No. 6,115,713 to Pascucci et al discloses a networked system having a wide variety of applications and particularly applicable to facilities management systems having multiple levels of software in processing nodes. The levels include a "features" processing level which communicates requests for data to a software object level containing databases of processes and attributes and database managers. The database managers in the software object level operate to provide data to the high level features in the same format. The software object level communicates with a hardware object level which also contains databases and database managers to mask differences between operational hardware units. By categorizing operational units by type, additional units of a known type can be added with only low level hardware object database changes. Adding units of a new type is facilitated by software changes confined to the lower level hardware and software objects, avoiding software changes at high level features. Individual software objects are tailored for typical types of inputs and output devices encountered by facilities management systems. Universal drive circuitry also provides applicability to a broad range of devices.

Therefore, it is an object of the present invention to provide an improved environmental control system for controlling the environment within a plurality of zones within a building with a plurality of heating, ventilating and air conditioning units.

Another object of this invention is to provide an improved environmental control system which alters the operation of a heating, ventilating and air conditioning unit in accordance with the operation of the remaining plurality of heating, ventilating and air conditioning units.

Another object of this invention is to provide an improved environmental control system that reduces the peak demand in electrical power required by all of the plurality of heating, ventilating and air conditioning units.

Another object of this invention is to provide an improved environmental control system that enables a staggered start function of the plurality of heating, ventilating and air conditioning units.

Another object of this invention is to provide an improved environmental control system that extends the period of time required for the heating, ventilating and air conditioning units to obtain the selected temperature.

Another object of this invention is to provide an improved environmental control system extends prevents the starting of a second heating, ventilating and air conditioning unit until a first heating, ventilating and air conditioning unit is finished normal operation.

Another object of this invention is to provide an improved environmental control system that alters the operation of a heating, ventilating and air conditioning unit in accordance the operational history of a selected one of the plurality of heating, ventilating and air conditioning units or in accordance with the operation of all of the plurality of heating, ventilating and air conditioning units.

Another object of this invention is to provide an improved environmental control system that provides multiple modes of operation including a preferred first non-overlap mode for preventing the simultaneous actuation of multiple heating, ventilating and air conditioning units.

Another object of this invention is to provide an improved environmental control system that provides a less preferred second overlap mode permitting simultaneous actuation of multiple heating, ventilating and air conditioning units for only a limited time period.

Another object of this invention is to provide an improved environmental control system that provides a least preferred third demand saver setback mode lessening the environment requirements to reduce the need to simultaneous actuate multiple heating, ventilating and air conditioning units.

Another object of this invention is to provide an improved environmental control system that disregards the operation of one of said plurality of heating, ventilating and air conditioning units operating in excess of a pre-selected period of time.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to an environmental control system for controlling the environment within a plurality of zones within a building with a plurality of heating, ventilating and air conditioning units. The environmental control system comprises a plurality of controllers for controlling the plurality of heating, ventilating and air conditioning units, respectively. Each of the plurality of controllers includes a temperature sensor connected to a thermostat control for controlling a heating, ventilating and air conditioning unit in accordance with an output from the temperature sensor. A link interconnects the plurality of controllers into a network. Each of the plurality of controllers has a controller for altering the operation of the thermostat control in accordance with the operation of the remaining plurality of controllers interconnected into the network.

In a more specific embodiment of the invention, the controller controls the thermostat control to reduce the peak demand in electrical power required by all of the plurality of heating, ventilating and air conditioning units. In one example, the controller controls the thermostat control to stagger start the plurality of heating, ventilating and air conditioning units. In another example, the controller controls the thermostat control to extend the period of time required for the heating, ventilating and air conditioning units to obtain the selected temperature. In another example, the controller controls the thermostat control in accordance with the humidity within the zone of the building.

In another embodiment of the invention, the controller includes a memory for altering the operation of the thermostat control in accordance the operational history of the plurality of heating, ventilating and air conditioning units. The controller may alter the operation of the thermostat control in accordance with the operation of a selected one of the plurality of heating, ventilating and air conditioning units. In the alternative, the controller may alter the operation of the thermostat control in accordance with the operation of all of the plurality of heating, ventilating and air conditioning units.

In another specific embodiment of the invention, the link interconnecting the plurality of controllers into the network includes a peer-to-peer network. In another example, the link interconnecting the plurality of controllers into the network includes a wire network. In another example, the link interconnecting the plurality of controllers into the network includes a wireless radio frequency network.

The invention is also incorporated into the process for controlling the environment within a plurality of zones within a building with a plurality of heating, ventilating and air conditioning units. The process comprises establishing a set point for a desired temperature within each of the plurality of zones within the building. The actual temperature is sensed within each of the plurality of zones within the building. The difference (Δ) is determined between the actual temperature and the desired temperature within each of the plurality of zones within the building. A first of the plurality of heating, ventilating and air conditioning units is actuated within the zones having the greatest difference (Δ) between the actual temperature and the desired temperature. The operation of the first heating, ventilating and air conditioning unit is terminated upon the difference (Δ) between the actual temperature and the desired temperature obtaining a desired value. A second of the plurality of heating, ventilating and air conditioning units is actuated within the zones having the greatest difference (Δ) between the actual temperature and the desired temperature.

In a more specific example of the invention, the step of establishing the set point for the desired temperature within each of the plurality of zones within the building includes modifying the set point for the desired temperature in accordance with the humidity within each of the plurality of zones within the building.

The step of actuating the second of the plurality of heating, ventilating and air conditioning units within the zones occurs only after a normal end of the operation of the first heating, ventilating and air conditioning unit to prevent the simultaneous actuation of the first and second heating, ventilating and air conditioning units. The step of actuating the second of the plurality of heating, ventilating and air conditioning units within the zones limits the simultaneous actuation of the first and second heating, ventilating and air conditioning units.

In another mode of operation, the step of actuating the second of the plurality of heating, ventilating and air conditioning units within the zones occurs only when a preselected operating time remains for the first of the plurality of heating, ventilating and air conditioning units to limit the simultaneous actuation of the first and second heating, ventilating and air conditioning units. The set point for a desired temperature within each of the plurality of zones within the building includes resetting all of the set points within each of the plurality of zones to limit the simultaneous actuation of plural heating, ventilating and air conditioning units.

In another example of the invention, the process comprises the steps of controlling the plurality of heating, ventilating and air conditioning units with multiple modes of operation. The plurality of heating, ventilating and air conditioning units are controlled in a preferred first non-overlap mode for preventing the simultaneous actuation of multiple heating, ventilating and air conditioning units. The plurality of heating, ventilating and air conditioning units are controlled in a less preferred second overlap mode for permitting simultaneous actuation of multiple heating, ventilating and air conditioning units for only a limited time period. The plurality of heating, ventilating and air conditioning units are controlled in a least preferred third demand saver setback mode for lessening the environmental requirements within the plurality of zones within the building to reduce the need to simultaneously actuate multiple heating, ventilating and air conditioning units.

The foregoing has outlined rather broadly the more pertinent and important features of the present invention in order that the detailed description that follows may be better understood so that the present contribution to the art can be more fully appreciated. Additional features of the invention will be described herein after which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
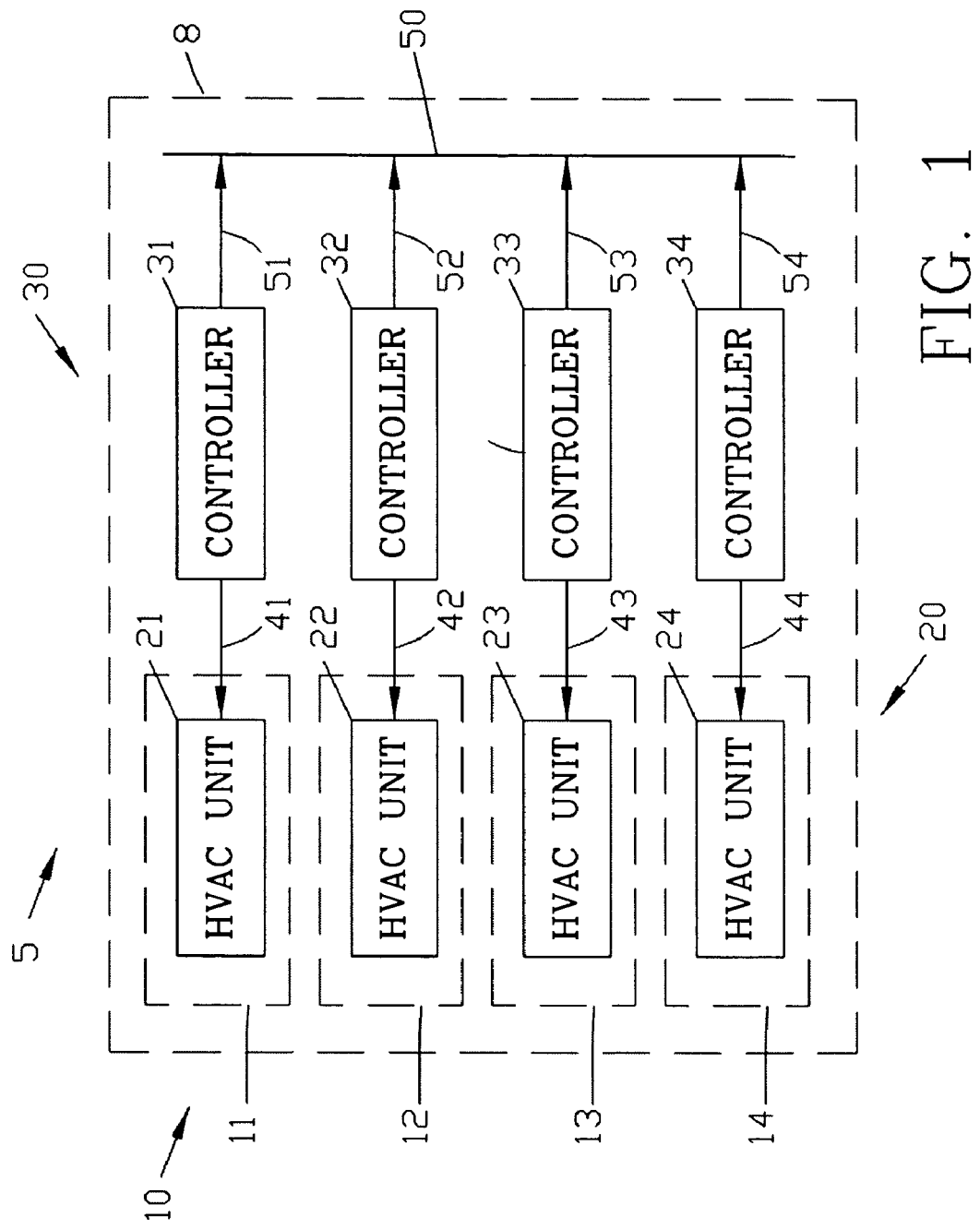
FIG. 1 is a block diagram of a first embodiment of an environmental control system of the present invention for controlling the environments within a plurality of zones within a building.

FIG. 1 is a block diagram of a first embodiment of an environmental control system 5 of the present invention for controlling the environment within a building 8 having a plurality of building zones 10. A plurality of heating, ventilation and air conditioning (HVAC) units 20 process the air within the plurality of building zones 10 in accordance with a plurality of controllers 30. In this example, the building 8 is shown having first through fourth building zones 11-14 with the each zone having heating, ventilation and air conditioning (HVAC) units 21-24 being controlled by controllers 31-34, respectively.

In this example, the plurality of heating, ventilation and air conditioning (HVAC) units 21-24 are shown as air conditioning and/or heating units of conventional design but it should be understood that the environmental control system 5 of the present invention is suitable for use with various other air processing, air filtering and purifying and air cooling and/or heating systems.

Electrical connectors 41-44 interconnect the heating, ventilation and air conditioning (HVAC) units 21-24 to the controllers 31-34. Although the building 8 has been shown having four building zones 11-14, it should be understood that the present invention is suitable for use with a building 8 having two or more building zones 10.

The environmental control system 5 of the present invention comprises the plurality of controllers 30 interconnected by a link 50 for controlling the plurality of heating, ventilation and air conditioning (HVAC) units 21-24. The link 50 is shown as a plurality of link elements 51-54 for interconnecting the controllers 31-34. The link 50 may be a conventional wired local area network (LAN) 50 or may be a wireless local area network (LAN) 50.

Figure 2:
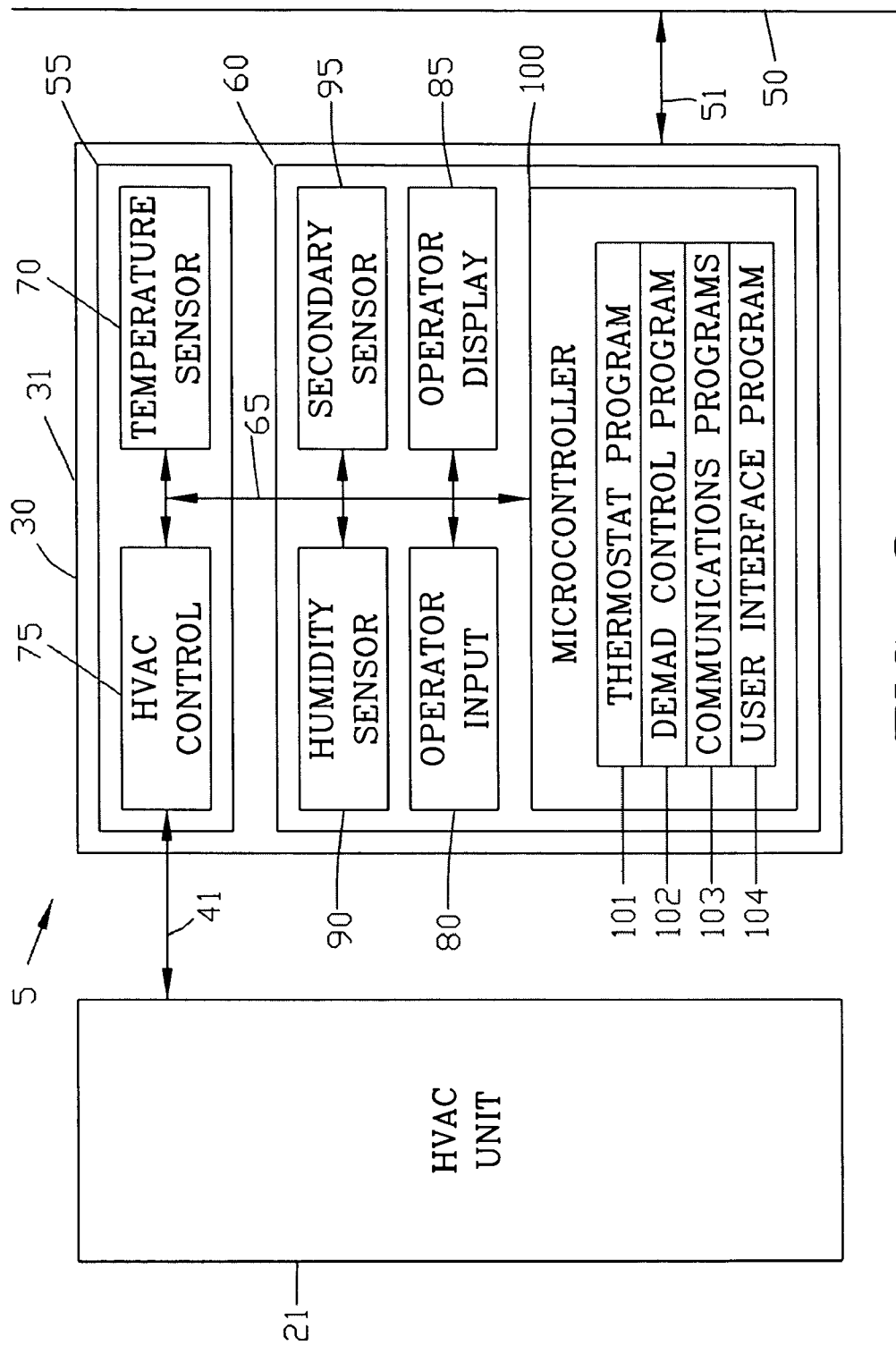
FIG. 2 is an expanded block diagram of a portion of FIG. 1.

FIG. 2 is an expanded block diagram of a portion of FIG. 1 illustrating the controller 31 for controlling the heating, ventilation and air conditioning (HVAC) unit 21. The controller 31 comprises a conventional thermostat 55 and a controller 60.

In this example, the controller 60 is an addition to the conventional thermostat 55. The controller 60 alters the operation of the conventional thermostat 55 in accordance with the operation of the remaining plurality of controllers 32-34 interconnected by the link 50. In the unlikely event of the failure of the controller 60, the conventional thermostat 55 continues to function in a conventional fashion.

The conventional thermostat 55 comprises a temperature sensor 70 and a thermostat control 75 for controlling the heating, ventilation and air conditioning (HVAC) unit 21 in a conventional fashion. The thermostat control 75 switches the heating, ventilation and air conditioning (HVAC) unit 21 between an operating condition and a non-operating condition in accordance with the output of the temperature sensor 70. The conventional thermostat 55 may be of various conventional designs as should be well-known to those skilled in the art.

The controller 60 includes an operator input 80 and an operator display 85. The operator input 80 enables an operator to enter information into the controller 60. The operator display 85 provides a visual indication of the information entered by the operator input 80 as well as providing a visual indication of the status and operating condition of the controller 60.

The controller 60 may optionally include a humidity sensor 90 as well as a secondary sensor 95. The secondary sensor 95 may represent a single secondary sensor or a plurality of secondary sensors for monitoring the environment within the building zone 11 of the building 8.

The controller 60 includes a microcontroller 100 for controlling the overall operations of the controller 60. The microcontroller 100 receives information on line 65 from the temperature sensor 70, the operator input 80, the humidity sensors 90 and the secondary sensor 95. In addition, the microcontroller 100 receives information on link element 51 from the controllers 32-34 along the link 50. The microcontroller 100 processes the received information and alters the operation of the conventional thermostat 55.

In this embodiment, the microcontroller 100 includes a thermostat program 101, a demand control program 102, a communications program 103 and a user interface program 104. The thermostat program 101, the demand control program 102, the communications program 103 and the user interface program 104 establish the algorithms to control the manner in which the controller 60 alters the operation of the conventional thermostat 55. The specific algorithms to control the manner in which the controller 60 alters the operation of the conventional thermostat 55 will be explained in greater detail with reference to FIGS. 8-10.

Figure 3:
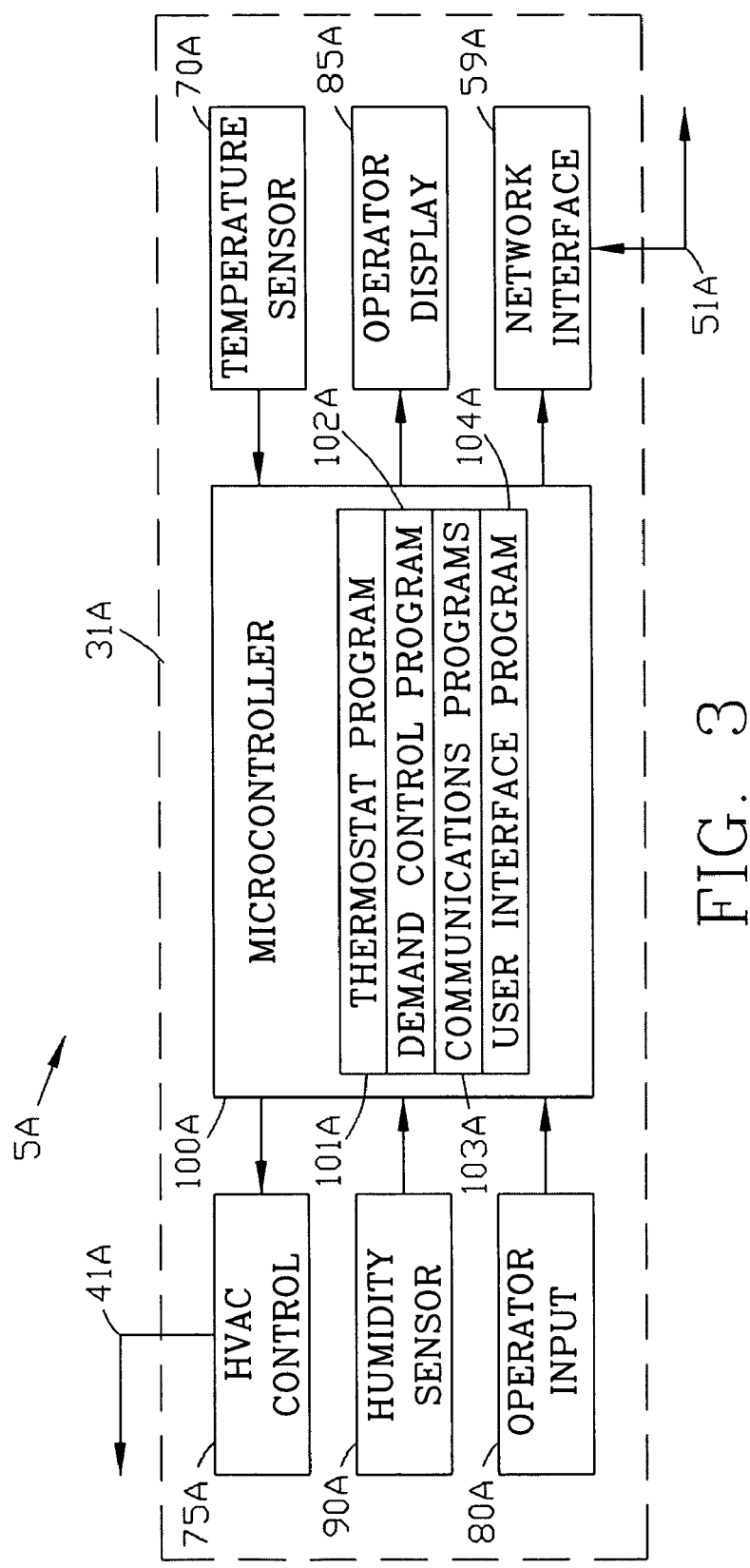
FIG. 3 is a block diagram of a second embodiment of an environmental control system of the present invention for controlling the environments within a plurality of zones within a building.

FIG. 3 is a block diagram of a second embodiment of the controller 30A of the present invention. In contrast to the use of a conventional thermostat 55 in FIGS. 1 and 2, the second embodiment utilizes a controller 31A specifically configured to provide an environmental control system 5A for controlling the environment within the building 8 having the plurality of building zones 10.

In this embodiment, the controller 31A receives an input from temperature sensor 70A for providing an output to the HVAC control 75A for controlling the heating, ventilation and air conditioning (HVAC) unit 21 on connector 41A. The controller 31A is connected to receive an operator input 80A to enable an operator to enter information into the controller 31A. The operator display 85A provides a visual indication of the information entered by the operator input 80A as well as providing a visual indication of the status and operating condition of the controller 31A. The controller 31A may optionally include a humidity sensor 90A.

The controller 31A includes a microcontroller 100A for controlling the overall operations of the controller 31A. The microcontroller 100A receives information from the temperature sensor 70A, the operator input 80A and the humidity sensors 90A. In addition, the microcontroller 100A receives information through a network interface 59A on link element 51A from the link 50A. The microcontroller 100A processes the received information and controls the operation of the heating, ventilation and air conditioning (HVAC) unit 21 on connector 41A.

In this embodiment, the microcontroller 100A includes a thermostat program 101A, a demand control program 102A, a communications program 103A and a user interface program 104A. The thermostat program 101A, the demand control program 102A, the communications program 103A and the user interface program 104A establish the algorithms to control the manner in which the controller 31A controls the operation of the heating, ventilation and air conditioning (HVAC) unit 21.

Figure 4:
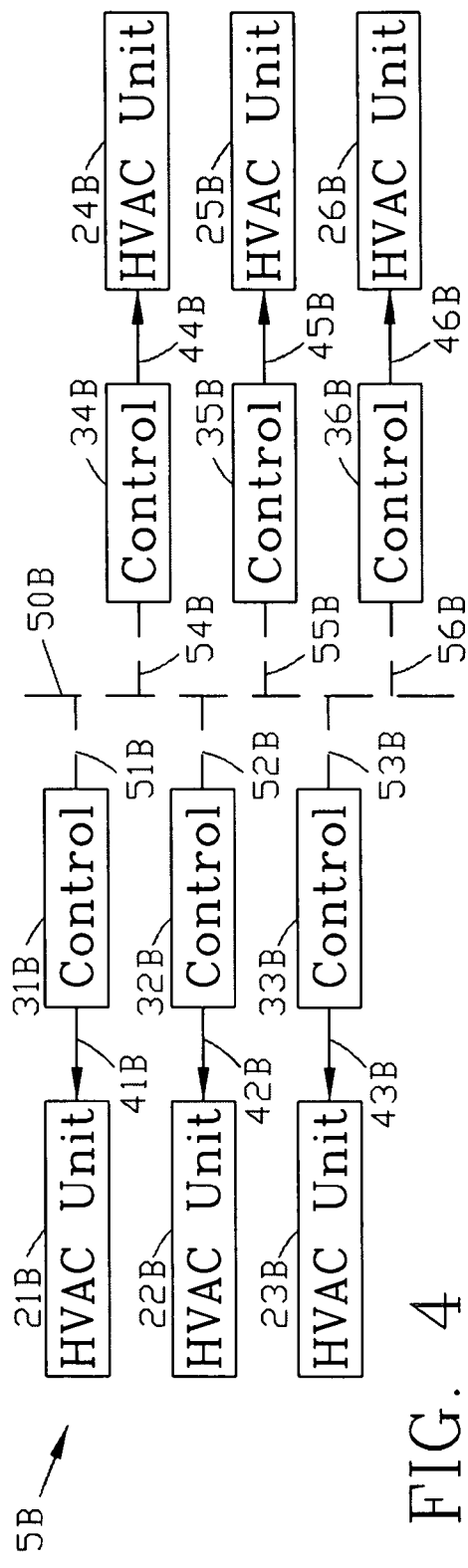
FIG. 4 is illustrates the environmental control system of the present invention utilizing a wireless peer-to-peer local area network (LAN)

FIG. 4 is a block diagram of a third embodiment an environmental control system 5B of the present invention. The environmental control system 5B comprises controllers 31B-36B connected to the heating, ventilation and air conditioning (HVAC) units 21B-26B by connectors 41B-46B. The controllers 31B-36B are interconnected by a wireless link 50B having link elements 51B-56B. Preferably, the wireless link 50B is in the form of wireless radio frequency (RF) LAN technology. The wireless link 50B may be any type of wireless connection as should be well know in the art.

In this embodiment, the wireless link 50B is shown as a peer-to-peer local area network (LAN). In a peer-to-peer local area network (LAN), each of the controllers 31B-36B operates independently based on the information received from the remainder of the controllers 31B-36B. The peer-to-peer communication allows communication through the wireless link 50B among the controllers 31-34.

The peer-to-peer communications provides autonomous and cooperative operation between and among the plurality of controllers 31B-36B. Each controller 31B-36B is capable of learning the operation of the associated heating, ventilation and air conditioning (HVAC) units 21B-26B. The data of the operation of the associated heating, ventilation and air conditioning (HVAC) units 21B-26B is collected and utilize to determine how to manipulate the operation of the environmental control system 5B. The controllers 31B-36B can collectively share information and cooperatively manage the operation of heating, ventilation and air conditioning (HVAC) units 21B-26B to control peak demand without the use of central intelligence or command system.

Figure 5:
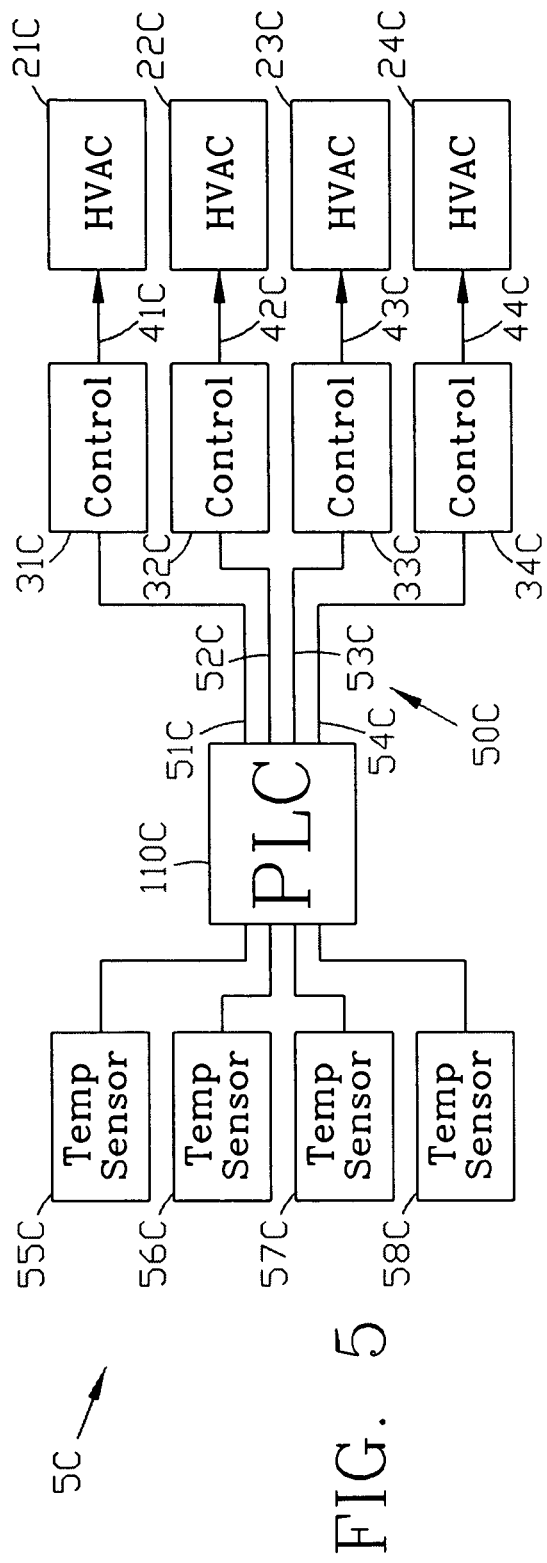
FIG. 5 is a block diagram of a third embodiment of an environmental control system of the present invention utilizing a central programmable logic controller (PLC)

FIG. 5 is a block diagram of a fourth embodiment an environmental control system 5C of the present invention. The environmental control system 5C comprises controllers 31C-34C connected to the heating, ventilation and air conditioning (HVAC) units 21C-24C by connectors 41C-44C. The controllers 31C-34C are connected by the link 50C to a central programmable logic controller (PLC) 110C. The central programmable logic controller (PLC) 110C receives input from the temperature sensors 55C-58C. The output of the central programmable logic controller (PLC) 110C is transferred on link elements 51C-54C to the controllers 31C-34C. In contrast to the peer-to-peer local area network shown in FIG. 4, the central programmable logic controller (PLC) 110C provide a single central control for the controllers 31C-34C. The central programmable logic controller (PLC) 110C operates as a master-slave protocol with the controllers 31C-34C.

Figure 6:
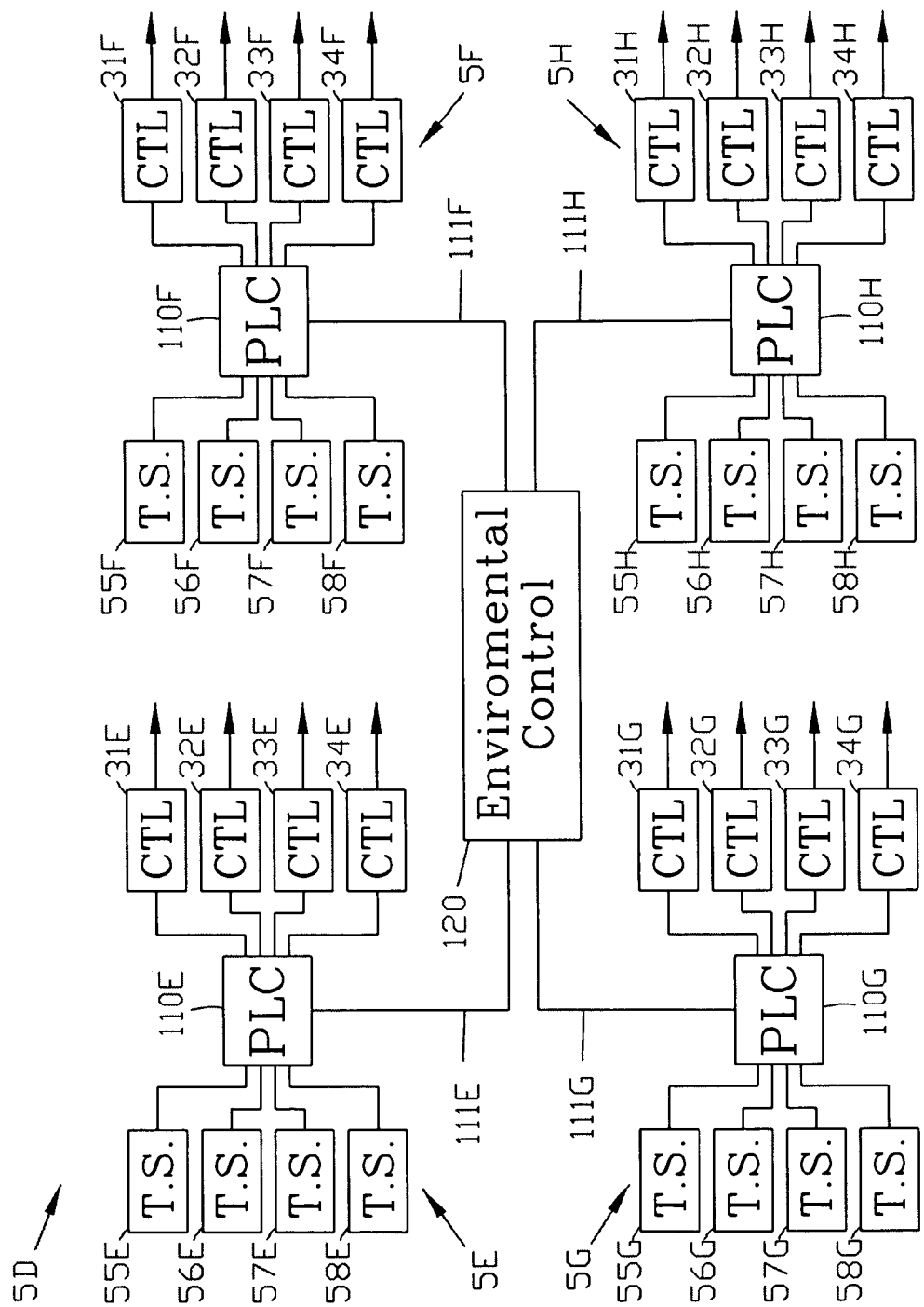
FIG. 6 is a block diagram of a fourth embodiment of an environmental control system of the present invention utilizing a de-centralized environmental control system.

FIG. 6 is a block diagram of a fifth embodiment of an environmental control system 5D of the present invention utilizing a de-centralized environmental control system 5D. The environmental control system 5D comprises subsystems 5E-5H. Each of the subsystems 5E-5H is substantially similar to the fourth embodiment of the environmental control system 5C shown in FIG. 5.

The environmental control system 5E comprises the temperature sensors 55E-58E connected to a programmable logic controller (PLC) 110E. The programmable logic controller (PLC) 110E provides an output to the controllers 31E-34E connected to heating, ventilation and air conditioning (HVAC) units not shown).

The environmental control system 5F comprises the temperature sensors 55F-58F connected to a programmable logic controller (PLC) 110F. The programmable logic controller (PLC) 110F provides an output to the controllers 31F-34F connected to heating, ventilation and air conditioning (HVAC) units not shown).

The environmental control system 5G comprises the temperature sensors 55G-58G connected to a programmable logic controller (PLC) 110G. The programmable logic controller (PLC) 110G provides an output to the controllers 31G-34G connected to heating, ventilation and air conditioning (HVAC) units not shown).

The environmental control system 5H comprises the temperature sensors 55H-58H connected to a programmable logic controller (PLC) 110H. The programmable logic controller (PLC) 110H provides an output to the controllers 31H-34H connected to heating, ventilation and air conditioning (HVAC) units not shown).

The programmable logic controllers (PLC) 110E-110H are connected through connectors 111E-111H to an environmental control 120. The environmental control 120 receives information from the programmable logic controller (PLC) 110E-110H for evaluating the operation of the environmental control system 5D. The environmental control 120 provides an output on connectors 111E-111H to the programmable logic controller (PLC) 110E-110H.

Figure 7:
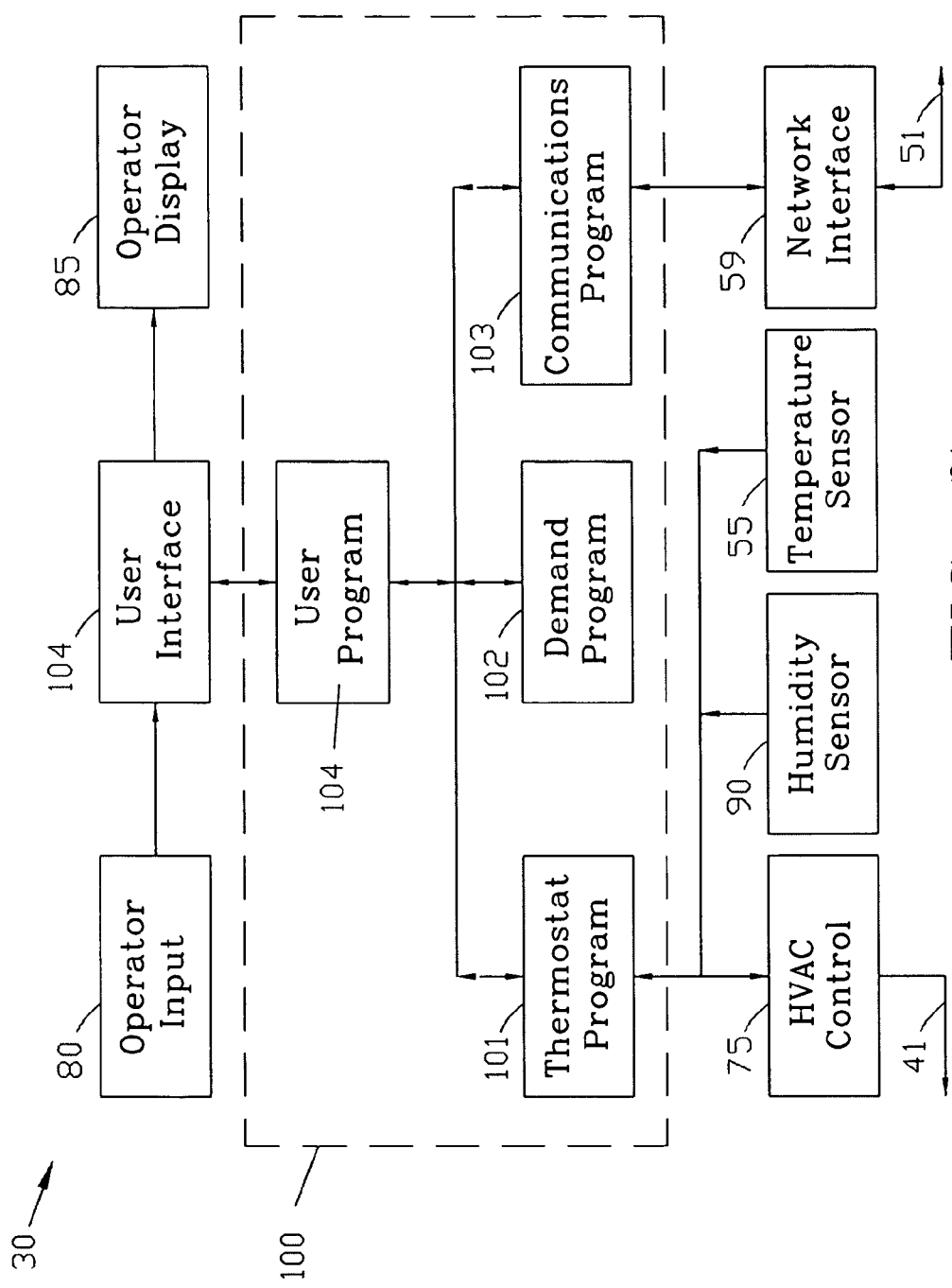
FIG. 7 is a logical diagram of the of the operation of the environmental control system.

FIG. 7 is a logical diagram illustrating the logical relationships of one of the controllers 30. The controller 30 comprises the thermostat program 101, the demand control program 102, the communications program 103 and the user interface program 104. The microcontroller 100 modifies the operation of the heating, ventilation and air conditioning (HVAC) unit 21 based on information the controller 30 collects from the temperature sensor 70 and humidity sensors 90. The microcontroller 100 also modifies the operation of the heating, ventilation and air conditioning (HVAC) unit 21 based on information received through the communications program 103 from the network interface 59 and the link element 51.

The primary purpose of the system 5 is to control power demand and thereby reduce demand charges imposed by many utilities. Electric utility customers in certain commercial categories are billed for the electrical power utilized as well as the demand of electrical power utilized by the customer. Typically, demand is measured over a time interval such as 15 to 30 minutes. Over that time interval, any time within the billing period, the highest electrical power usage is determined and the power consumed during that interval is billed at a much higher rate. The demand billing compensates the electrical utility for the additional capacity and distribution equipment required to provide the temporarily higher power demanded by customers. If an electric utility customer limits the peak electrical power used, the electric utility customer will reduce the higher demand charges from the electric utility. The reduction of the higher demand charged from the electric utility is a primary goal of the present invention.

The controller 30 uses a temperature set point for an initial temperature control. The temperature set point may be modified by the controller 30 upon the actuation of operating functions of the controller 30. The operating functions of the controller 30 include a staggered start function, a ramping function, a comfort zone function and a demand leveling function.

Each of the controllers 30 requires an address for the link 50. A menu selection on the operator display 85 allows the controller 30 to display the addresses of all of the controllers 30. Preferably, the controller 30 includes an auto-select mode for automatically selecting the next available address for the next controller 30.

The first controller 30 placed in the auto-select mode will acquire address 01, the second controller 30 will acquire address 02 until all of the controllers 30 are assigned an address. Each controller 30 will broadcast a status query when placed in auto-select mode. Each controller 30 with an address will respond starting with the lowest address. Each controller 30 includes a timeout function such that, if for any reason a controller 30 cannot respond in its time slot, the controller 30 with the next address will respond. The status message includes the state of the HVAC unit 20, the set point temperature, the enabled functions, the time and list of valid addresses. If no other controller 30 responds in the allotted time, the first controller 30 will take address 01. As the user installs each controller 30, each controller 30 will acquire the next available address.

There are 16 possible addresses (4 bits) with two reserved for special purposes, leaving 14 available for HVAC units 20. Each address is treated like a zone address such that other types of module can be added later and associated with a specific HVAC unit 20 through the HVAC unit 20 address. An identifier field (4 bits) is used to give the controller 30 and each module within the zone a unique address. This scheme gives the user 14 zones with maximum of 224 controllers 30 and/or monitors in a single network.

Set up parameters can be set in each controller 30 independently with the exception of time and day. Parameters can also be set in one controller 30 and the settings will propagate to all other controllers 30. The controller 30 with the lowest address is used to synchronize the time for all controllers 30. If an option is enabled the lowest address controller 30 will synchronize all other controllers to identical parameters as those set in the lowest address controller 30. While this synchronization option is enabled all other controllers will ignore local signal input. If for some reason the controller 30 with the lowest address had no time/day setting (due to loss of power), the system 5 would initially take the time and day from the controller 30 with second lowest address and provide the time/day for subsequent transmissions to other controllers 30. If the lowest address controller 30 were to fail, the second lowest address controller 30 would assume the roll until a lower address controller 30 joins the network.

Each thermostat 50 component of the controller 30 has a minimum and maximum range that sets the highest and lowest allowed temperature. Preferably, the default values are a low of 60° F. and a high of 99° F. A user can change these values through a menu selection on the operator display 85.

Time and day data may be entered into the system 5 by the operator input 80 through a menu selection on the operator display 85. For the ramping function, time and day are required for operation. If time is not provided, the controllers 30 will default to a time of day setpoint. The lowest address controller 30 will propagate the time and day to all other controllers 30.

One or more events may be selected for a set point temperature. Each event time indicates the time at which the set point establishes the operating parameters. Other functions can modify the set point based on the operation of each of the controllers 30. The schedule can be set for each individual day, for a defined group of days and for weekdays and weekends.

An HVAC unit 20 power rating parameter may be entered. The specified or actual power in kW may be entered for cooling and heating. If power is not known, the tonnage may be entered for each HVAC unit 20 and can be used for cooling and heating. These values are used by the demand leveling function to determine which HVAC units 20 should be allowed to operated simultaneously.

When the controller 30 is on, the controller 30 records, in memory, the starting temperature, set point temperature and duration of the HVAC unit 20 operation for each 2-degree (F) change in temperature until the set point is reached. After the set point is reached, the controller 30 continues to record the duration and duty cycle of each cycle of the HVAC unit 20. The last recorded is used for the overlap mode.

The information collected is the thermal duty cycle for the area heated or cooled by an HVAC unit 20 and is used to determine the scheduling of HVAC units 20 among controllers 30. Each controller 30 estimates how long it will take to reach set point based on the total number of HVAC units 20. This information is used for both staggered start function and the peak demand function. This information is updated at regular intervals.

Each controller 30 learns the assigned addresses of each other controller 30 in the LAN 50 network. The information is stored within the controller 30 and updated as each controller 30 transmits information during operation. When each controller 30 has completed a learning mode, each controller 30 joins the LAN 50 network to determine a schedule for staggered start function and demand leveling function.

A. Staggered Start Function

Figure 8:
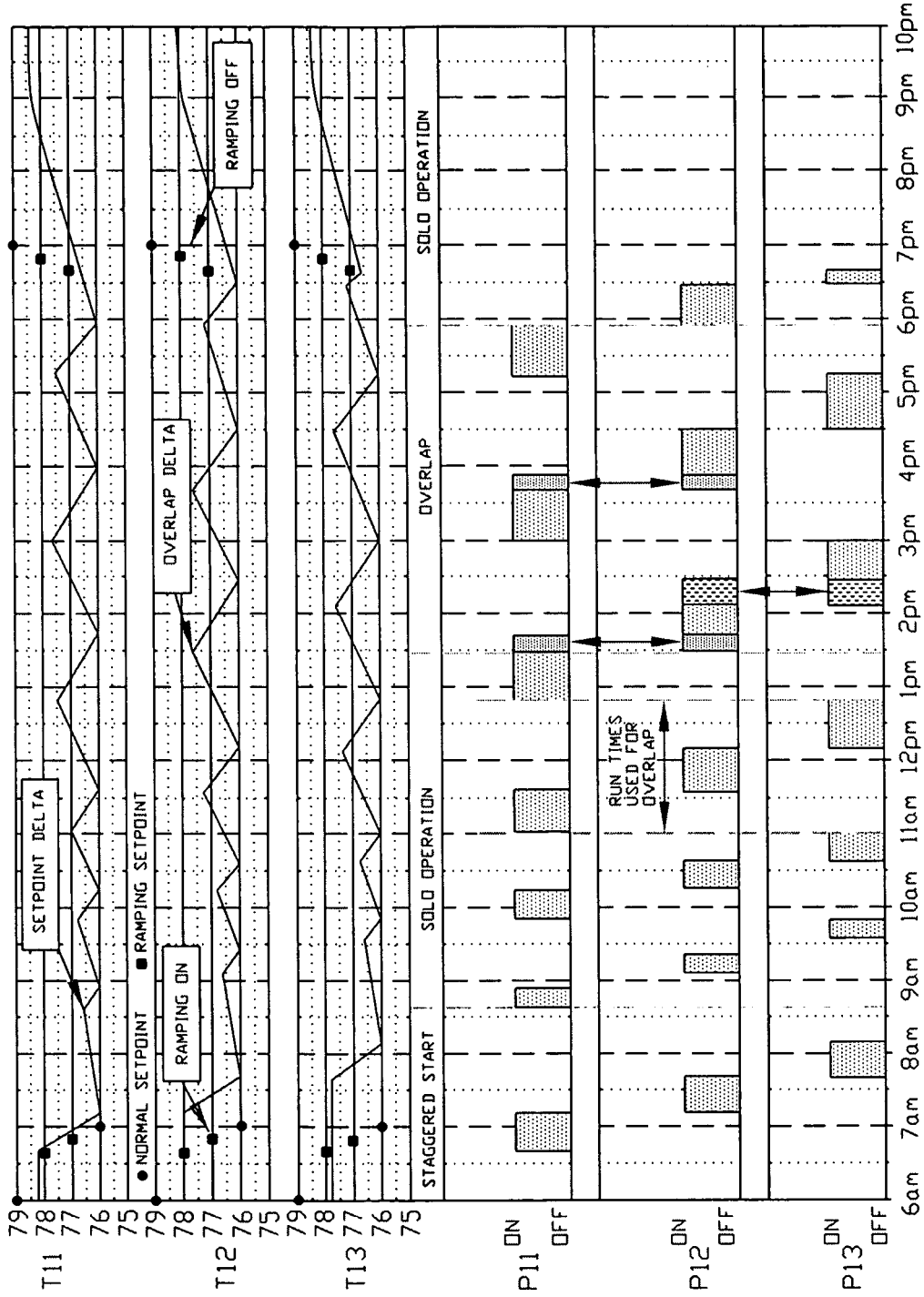
FIG. 8 is a graphical illustration of the environmental control system for three zones within a building operating in a non-overlapping mode of operation and in an overlapping mode of operation.

FIG. 8 is a graphical illustration of the environmental control system 5 for three zones 11-13 within a building 8. The temperature within each of the zones 1-3 is shown as $T_{11}$, $T_{12}$ and $T_{13}$ where as each of the HVAC units 21-23 consumes electrical power levels $P_{11}$, $P_{12}$ and $P_{13}$ in the zones 11-13.

In one embodiment, the first algorithm presents a staggered start function that allows only one HVAC unit 20 to operate at a time. The control system 30 determines if an HVAC unit 20 needs to operate by measuring the ambient temperature in the area heated or cooled by that HVAC unit 20. The value, equal to the difference between the desired temperature (set point) and the actual temperature is used to determine the need to turn on the HVAC 20. This measurement is made in each zone 11-13 and will be called the "delta". The HVAC unit 20 within the zone with the greatest delta value is the only HVAC unit 20 allowed to operate until the setpoint of is reached. Two or more zones with the same exact delta value are resolved using any one of several arbitration methods selected during installation of the controller 30 of the HVAC unit 20. These arbitration methods include an assigned numeric value, a random number generator, length of time the HVAC unit 20 has been off, the length of the estimated operating time for the HVAC unit 20 and the like.

The staggered start function is used at the inception of operation and establishes the initial staggered start function of the HVAC units 20. This process also allows HVAC units 20 with high heat loads or excessive cooling requirements to operate multiple times relative to other HVAC units 20 with much smaller loads to cycle on and off at much lower rates. Initially, this staggered start function takes place only after the operating HVAC unit 20 stops operating.

An example of the staggered start function is shown in FIG. 8. The environmental control system 5 initiates operation of HVAC unit 21 in zone 11 as indicated by electrical power levels $P_{11}$. The temperature $T_{11}$ within the zone 11 is correspondingly reduced by the operation of HVAC unit 21 in the zone 11. After the termination of operation of the HVAC unit 21 in the zone 11, the environmental control system 5 initiates operation of HVAC unit 22 in zone 12 as indicated by electrical power levels $P_{12}$. The temperature $T_{12}$ within the zone 12 is correspondingly reduced by the operation of HVAC unit 22 in the zone 12. After the termination of operation of the HVAC unit 22 in the zone 12, the environmental control system 5 initiates operation of HVAC unit 23 in zone 13 as indicated by electrical power levels $P_{13}$. The temperature $T_{13}$ within the zone 13 is correspondingly reduced by the operation of HVAC unit 23 in the zone 13.

B. Ramping Function

In conjunction with staggered start function, ramping function can be enabled. The ramping function temporarily adjusts the set point from the limit temperature over a period of time, to gradually reach the normal set point within 30 to 60 minutes of the start time. The ramping function also adjusts the set point 30 to 60 minutes before the end time, slowly adjusting the set point to gradually move toward the limit temperature. The ramping function defines a slope of temperature change that saves energy cost over a simple staggered start function and also applies this saving to the end of operation as well.

C. Comfort Zone Function

An optional comfort zone operation mode may be incorporated into the controller 30. The operator input 80 and operator display 85 enables an operator to actuate the comfort zone mode. This comfort zone mode is based on comfort zone tables that indicate for a specific humidity level, a corresponding specific temperature exists which feels the same to an occupant as a differing humidity temperature combination. When the comfort zone mode is enabled, humidity measurements alter the set point temperature according to an operator selected value allowing a lower cost set point to be used. The operator sets comfort level as a percentage of comfort based on the available temperature range of the comfort zone tables. The comfort zone function begins after the initial set point is achieved and continues until another function takes control of the set point.

D. Demand Level Function

The environmental control system 5 includes the demand level function for controlling the HVAC units 21-23 for the three zones 11-13 within a building 8. The environmental control system 5 has the ability to control the total peak demand of multiple HVAC units 21-23. The environmental control system 5 uses algorithms various modes of operation including a non-overlap mode, an overlap mode, a demand saver setback mode and an override mode.

D1. Non-Overlapping Mode

FIG. 8 is a graphical illustration of the environmental control system 5 for three zones 11-13 within a building 8 in a non-overlapping mode of operation and in an overlapping mode of operation. The temperature within each of the zones 11-13 is shown as $T_{11}$, $T_{12}$ and $T_{13}$ whereas each of the HVAC units 21-23 consumes electrical power levels $P_{11}$, $P_{12}$ and $P_{13}$ in the zones 11-13.

The first algorithm presents a non-overlapping mode, which provides for staggered start function and continuing peak demand leveling function using a mechanism that allows only one of the HVAC units 21-23 to operate at a time. This embodiment is a method for determining which of the HVAC units 21-23 is allowed to operate when more than one needs to operate at one time.

In most systems demand is controlled by load shedding at a point where the system determines a maximum power level has been or is about to be reached. At that time, components of an HVAC system that are operating are interrupted and shut down in an effort to reduce or limit the power consumption. Load shedding disrupts the normal operation of the equipment controlling the environment within the building to limit peak demand charges.

The algorithm incorporated in the present invention works differently in that each of the HVAC units 21-23 is allowed to complete the heating or cooling process prior to the initiation of the next one of the HVAC units 21-23. No load shedding occurs. Instead each of the HVAC units 21-23 is held back an appropriate time and then allowed to operate based on temperature measurements among the HVAC units 21-23.

In the present embodiment, the environmental control system 5 determines if one of the HVAC units 21-23 needs to operate by measuring the ambient temperature $T_{11}$, $T_{12}$ and $T_{13}$ in the zones 11-13. The value, equal to the difference between the desired temperature (set point) and the actual temperature is used to determine the need to turn on each of the HVAC units 21-23. This measurement is made in each of the zones 11-13 is called the "delta". For example, if zone 11 has the greatest delta value, then only the HVAC unit 21 is allowed to operate until the setpoint is reached.

FIG. 8 illustrates the non-overlapping mode of operation between the hours of 6:00 AM to approximately 11:30 AM. The temperature within each of the zones 11-13 is shown as $T_{11}$, $T_{12}$ and $T_{13}$ where as each of the HVAC units 21-23 consumes electrical power levels $P_{11}$, $P_{12}$ and $P_{13}$ in the zones 11-13.

D2. Overlap Mode

The environmental control system 5 utilizes a second algorithm to determine if overlapping operation of the HVAC units 21-23 should occur and to what extent. This second algorithm is the overlap mode and alters the operation of the HVAC unit 21-23 to allow multiple HVAC units 21-23 to operate simultaneously during some portion of the operating time of the HVAC units 21-23.

With the staggered start function, non-overlap mode controlling the operation of the HVAC unit 20, each HVAC unit 20 must wait to operate while the designated "on" HVAC unit 20 operates until the setpoint of the designated HVAC unit 20 is achieved. This causes temperatures to rise (cooling) or fall (heating) moving other HVAC units 20 further away from their respective set points. Consequently, each HVAC unit 20 when designated "on" to operate takes longer and longer to reach the established set point, thereby further extending the delta, or temperature difference between set point and actual temperature. When the staggered start function, non-overlap mode controlling the system 5 operation is allowed to continue, temperatures would become unacceptable and the cycling of temperatures from desired to undesirable require increasingly greater periods of time. Utilizing this second algorithm, the overlap mode, a maximum delta limit or the greatest difference between the set point and the actual temperature is established in the controller 30 for each HVAC unit 20 to be used for determining HVAC unit operation. As the maximum delta limit is exceeded in any zone 10, the overlap mode assumes control of the system 5. The system 5 then determines how the overlap should occur relative to other HVAC units 20 by using a number of parameters that have been collected by the respective controllers 30 throughout the operation of each of the HVAC units 20.

In another embodiment of the present invention, the system 5 maintains data relative to the run time and heating and cooling rates of each HVAC unit 20. The run time is defined as the actual time an HVAC unit 20 requires to reach the desired set point temperature from the temperature at which it begins the heating or cooling process. The heating and cooling rates are defined as measurements of temperature change per HVAC unit 20 operating period. For example, if an HVAC unit 20 requires ten minutes to cool a zone 10 by 1 degree and reach the required setpoint, the HVAC unit 20 run time is 10 minutes and the cooling rate of the HVAC unit 20 is 0.1 degrees per minute. The system 5 also maintains a record of the HVAC units 20 that have operated and declares a 'cycle' has occurred when all the HVAC units 20 that were required to operate in a given period have had an opportunity to operate. A cycle is then equal to the sum of all the run times of all the HVAC units 20 that have operated. An HVAC unit 20 may have any number, operations during a single cycle.

When an HVAC unit 20 has reached the maximum limit delta or overlap temperature limit, the controller 30 enters the overlap mode. Other HVAC units 20 remain in the non-overlap mode unless, individually, the HVAC units 20 reach the maximum limit delta or overlap limit over time for the respective HVAC unit 20. The system 5 calculates how long the HVAC unit 20 in overlap mode must operate to reach the required setpoint. The difference between this calculated overlap mode time and the last run time is the overlap time for that HVAC unit 20. The next calculation performed by the controller 30 determines when the overlap should begin by estimating how long the presently operating HVAC unit 20 has to operate and adjusts the start time for the overlapping HVAC unit 20 to equal the calculated overlap time. In the previous example the run time was 10 minutes and the cooling rate was 0.1 degrees per minute. If the overlap limit is 1.5 degrees it will take 15 minutes to cool that zone 10. The overlap time is 5 minutes. If the presently operating HVAC unit 20 is estimated to operate 18 minutes and has already operated for 10 minutes, then the overlapping HVAC unit 20 will begin to operate in 3 minutes, overlapping the presently operating HVAC unit 20 by 5 minutes. Therefore, if the remaining time for the operating HVAC unit 20 is less than the overlap time, the overlapping HVAC unit 20 would begin operating immediately.

Additionally, when an HVAC unit 20 enters overlap mode, the cycle time is fixed to be equal to the cycle time during which overlap first occurred. The run times that make up this cycle are used for calculating overlap time. This keeps the cycle from continuing to expand, as previously described, by forcing any increase in run time for any HVAC unit 20 to occur as overlap operation. This limits the temperature variation to an acceptable level.

As the heating or cooling continues, HVAC units 20 will be either in the non-overlap or overlap mode. However, if the thermal load continues, HVAC units 20 will move to the overlap mode. To determine how much overlap should occur over successive cycles, the delta value is examined. As a zone is heated or cooled, diverging from the setpoint, the HVAC unit 20 will experience larger and larger delta values until the HVAC unit 20 is allowed to operate. At the decision point where the controller determines that a HVAC unit 20 should operate, the present delta is compared to the previous delta. A new overlap time is calculated that is shorter or longer to accommodate the difference. If the present delta requires no overlap time or the HVAC unit 20 has a delta too low to require operation, that unit is reverts back to non-overlap mode. When all HVAC units 20 return to the non-overlap mode, the cycle time is no longer fixed and run times are updated based on the continuing operation in non-overlap mode.

D3. Demand Saver Setback Mode

Figure 9:
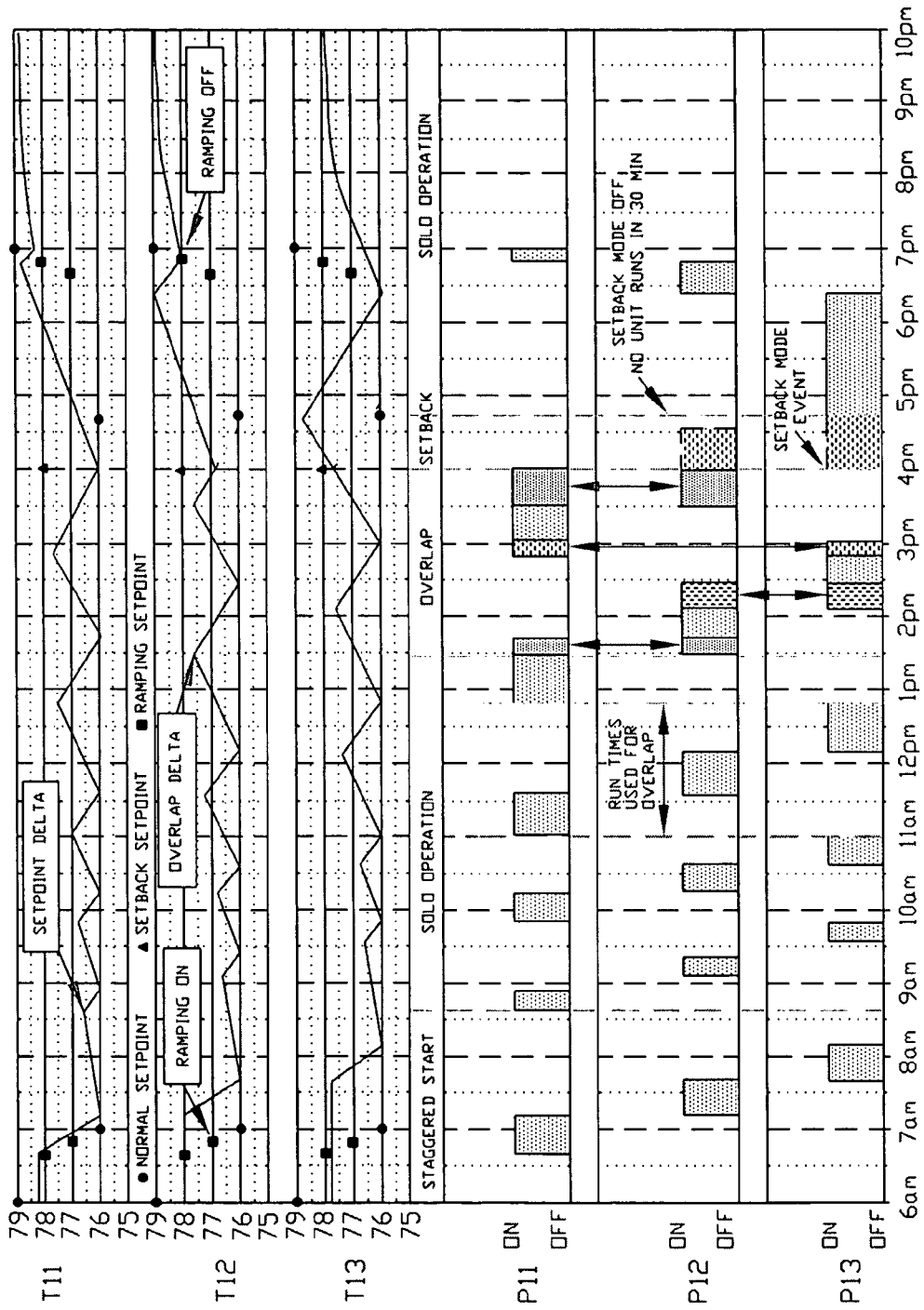
FIG. 9 is a graphical illustration of the environmental control system for three zones within the building operating in a demand saver setback mode of operation.

FIG. 9 is a graphical illustration of the environmental control system 5 in a demand saver setback mode of operation. The demand saver setback mode occurs as the operation of more of the HVAC units 21-23 overlap each other attempting to achieve the respective setpoints. The environmental control system 5 monitors the number of the HVAC units 21-23 running simultaneously and when one less than all of the HVAC units 21-23 runs for a specified period of time, the setpoint for all the HVAC units 21-23 is modified by a specified number of degrees to reduce the need for the HVAC units 21-23 to operate. Once all of the HVAC units 21-23 are no longer required to operate in overlap mode the setpoints of the HVAC units 21-23 will be returned to the previous setpoint values for each of the HVAC units 21-23.

E4. Override Mode

Figure 10:
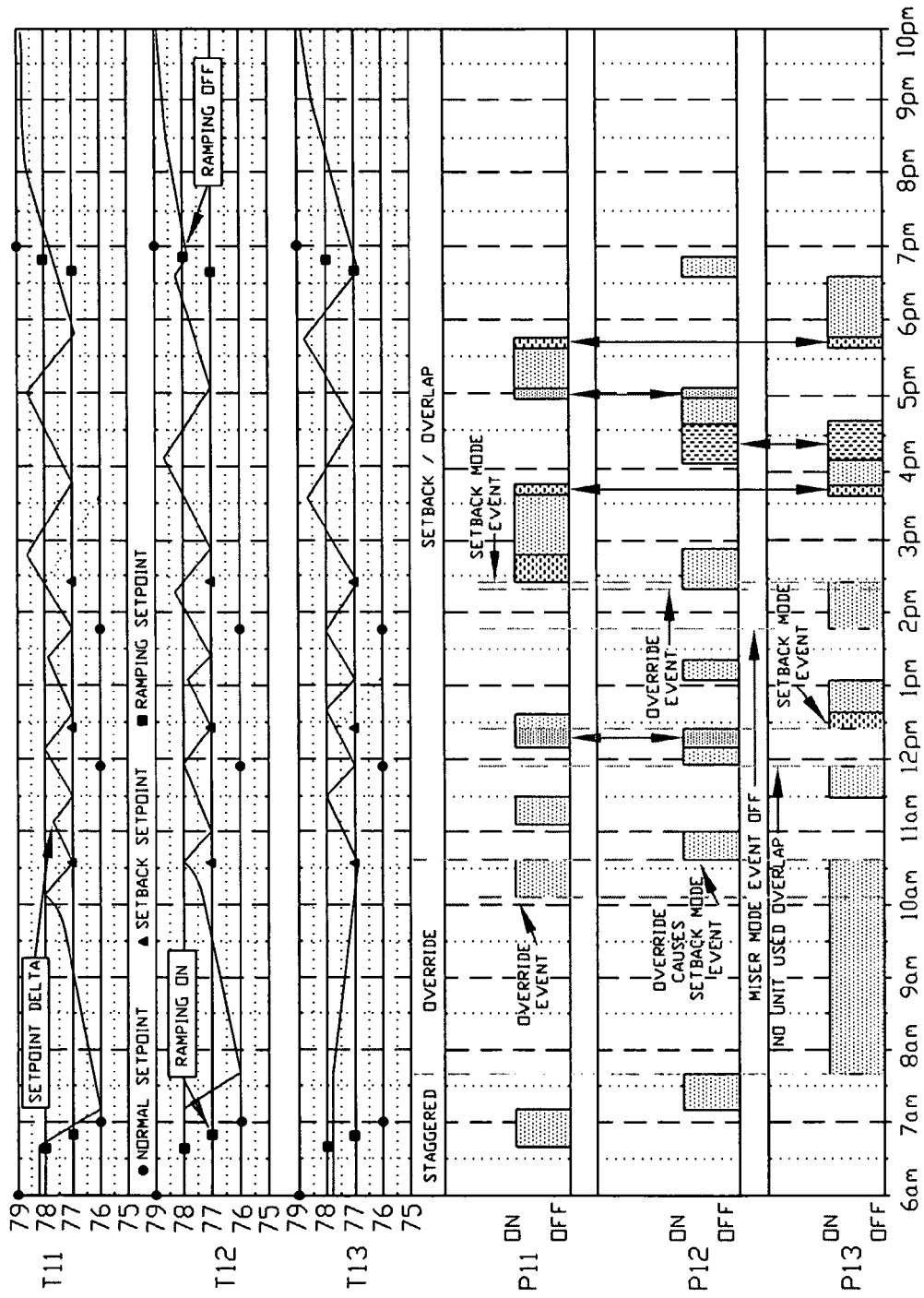
FIG. 10 is a graphical illustration of the environmental control system for three zones within the building operating in an override mode of operation.

FIG. 10 is a graphical illustration of the environmental control system 5 in an override mode of operation. The override mode of operation is used to mitigate the HVAC units 21-23 operating continuously while under demand control. When one of the HVAC units 21-23 operating operates for long periods of time, possibly continuously, an issue is developed for the other HVAC units 21-23 since the algorithm requires one of the HVAC units 21-23 to stop operating before operating another one of the HVAC units 21-23. Under this requirement, the other of the HVAC units 21-23 would never operate while one of the HVAC units 21-23 is operating continuously.

The override mode is invoked which ignores the continuously operating one of the HVAC units 21-23. For example, the electrical power $P_3$ of the HVAC unit 23 appears to begin continuous operation at 8:00 AM. The remaining HVAC unit 21 and 22 do not operate in the non-override mode. The continuous operation of the HVAC unit 23 may be due to various causes including the windows and doors being left open.

When the remaining HVAC units 21-22 have a large enough delta, the environmental control system 5 will begin to determine the need to enter override mode. If the continuously operating HVAC unit 23 has not reduced the delta value after a specified time interval or the HVAC unit 23 has not reached the setpoint after a specified time, the environmental control system 5 allows the operating remaining HVAC units 21 and 22. The override mode differs from the overlap mode since no calculation is performed in the override mode. The override mode totally ignores the continuously operating HVAC unit 23 and allows the remaining HVAC units 21 and 22 to operate in a non-overlap mode. After the continuously operating HVAC unit 23 stops operating, The HVAC unit 23 return to normal operational conditions.

The present invention provides an improved environmental control system for controlling the environment within a plurality of zones within a building with a plurality of heating, ventilating and air conditioning units. The improved environmental control system which alters the operation of a heating, ventilating and air conditioning unit in accordance with the operation of the remaining plurality of heating, ventilating and air conditioning units.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An environmental control system for reducing the peak demand in electrical power required by controlling the environment within a plurality of zones within a building with a plurality of heating, ventilating and air conditioning units, comprising:

a plurality of controllers for controlling the plurality of heating, ventilating and air conditioning units within the plurality of zones within the building, respectively;

each of said plurality of controllers including a temperature sensor connected to a thermostat control for measuring a measured temperature within each of the plurality of zones within the building, respectively;

each of said plurality of controllers having a desired set point temperature for generating a delta value representative of the temperature difference between said desired set point temperature and said measured temperature within the plurality of zones within the building, respectively;

each of said plurality of controllers having a maximum delta value limit;

a link interconnecting said plurality of controllers into a network;

each of said plurality of controllers altering the operation of said thermostat control within each of the plurality of zones within the building by way of a preferred first non-overlap mode and a less preferred second overlap mode and a least preferred third demand saver setback mode and in accordance with the operation of the remaining plurality of controllers interconnected by said link to reduce the peak demand in electrical power required by operation of all of the plurality of heating, ventilating and air conditioning units;

said preferred first non-overlap mode of operation for preventing the simultaneous actuation of multiple heating, ventilating and air conditioning units and for actuating a selected one of said controllers having the greatest delta value;

said less preferred second overlap mode of operation for permitting simultaneous actuation of multiple heating, ventilating and air conditioning units for said controllers having a delta value exceeding said maximum delta value limit;

said least preferred third demand saver setback mode of operation for raising said desired set point temperature of all of the plurality of controllers within the plurality of zones within the building thereby lessening the environment requirements within the plurality of zones within the building to reduce the need to simultaneous actuate multiple heating, ventilating and air conditioning units.

2. An environmental control system as set forth in claim 1, wherein said controller controls said thermostat control in accordance with the humidity within the zone of the building.

3. An environmental control system as set forth in claim 1, wherein said controller includes a memory for altering the operation of said thermostat control in accordance the operational history of the plurality of heating, ventilating and air conditioning units.

4. An environmental control system as set forth in claim 1, wherein said link interconnecting said plurality of controllers into said network includes a peer-to-peer network.

5. An environmental control system as set forth in claim 1, wherein said link interconnecting said plurality of controllers into said network includes a wire network.

6. An environmental control system as set forth in claim 1, wherein said link interconnecting said plurality of controllers into said network includes a wireless radio frequency network.

7. An environmental control system as set forth in claim 1, including an override mode wherein an operation of one of said plurality of heating, ventilating and air conditioning units in excess of a preselected period of time will be disregarded from consideration of the remaining modes of operation.

8. A process for reducing the peak demand in electrical power required by controlling the environment within a plurality of zones within a building with a plurality of heating, ventilating and air conditioning units, comprising the steps of:

measuring a temperature within each of the plurality of zones within the building, respectively;

establishing a desired set point temperature for each of the plurality of zones within the building, respectively;

establishing a maximum delta value limit for each of the plurality of zones within the building, respectively;

generating a delta value representative of a temperature difference between the desired set point temperature and the measured temperature within each of the plurality of zones within the building, respectively;

interconnecting the plurality of controllers into a network;

controlling the operation of within each of the plurality of zones within the building by way of one of a preferred first non-overlap mode and a less preferred second overlap mode and a least preferred third demand saver setback mode and in accordance with the operation of the remaining plurality of zones within the building to reduce the peak demand in electrical power required by operation of all of the plurality of heating, ventilating and air conditioning units;

the preferred first non-overlap mode of operation preventing the simultaneous actuation of multiple heating, ventilating and air conditioning units and for actuating a selected one of the heating, ventilating and air conditioning unit having the greatest delta value;

the less preferred second overlap mode of operation permitting simultaneous actuation of multiple heating, ventilating and air conditioning units within the zone having a delta value exceeding the maximum delta value limit;

the least preferred third demand saver setback mode of operation raising the desired set point temperature within all of the plurality of zones within the building thereby lessening the environment requirements within the plurality of zones within the building to reduce the need to simultaneous actuate multiple heating, ventilating and air conditioning units.

9. A process for controlling the environment within a plurality of zones within a building as set forth in claim 8, including the step of disregarding the operation of one of the plurality of heating, ventilating and air conditioning units operating in excess of a preselected period of time.

* * * * *